United States Patent Office 3,403,593
Patented Oct. 1, 1968

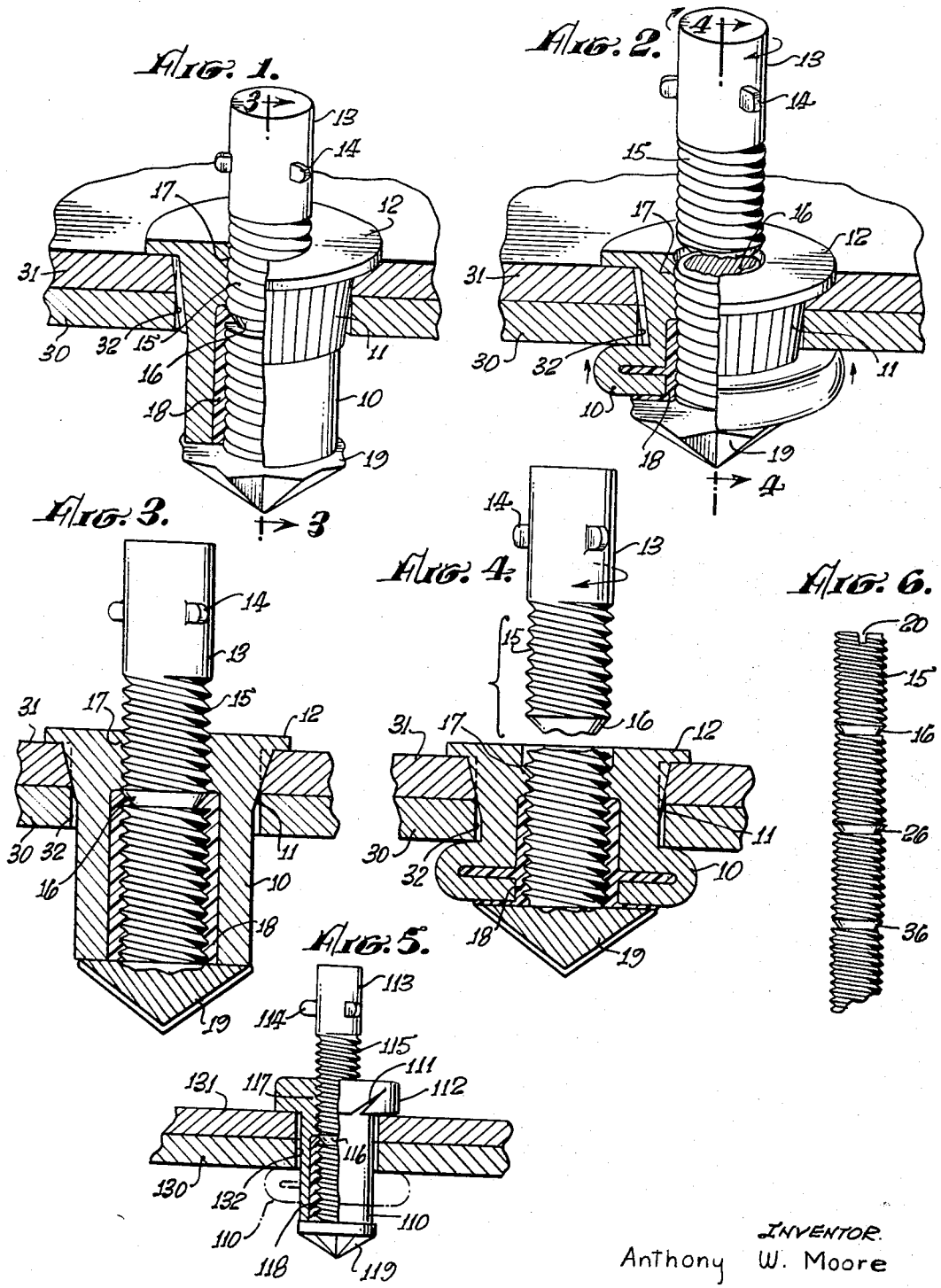

3,403,593
RIVET
Anthony W. Moore, 5173 Hallwood,
Riverside, Calif. 92506
Filed July 19, 1965, Ser. No. 473,007
2 Claims. (Cl. 85—68)

ABSTRACT OF THE DISCLOSURE

This is a self-drilling rivet utilizing a threaded insert on which the drill portion is attached and in which, after drilling, the rivet is secured by the threaded insert, and in which self-sealing plastic material is used.

---

This invention relates generally to rivets and more particularly, to a new and improved rivet having a frangible threaded shank in its interior.

In the field of fasteners in general, and rivets of various types in particular, there have been numerous advances in the art at various times, particularly recently, in the attempt to make such fasteners easier to apply, particularly by power driven or other automatic equipment.

In particular, there have been rivets of the so-called "pop" type which have become very popular because of their ease of application and numerous other developments have been made in connection with rivets to attempt to make them simpler of installation.

With all of the advances in the art of making and applying rivets, however, there has still been a very great failure to provide a rivet which is easy to apply and which will drill its own hole between metals or other materials being riveted, and which with one common power tool such as an electric drill can be drilled into place and actually riveted without leaving any surface protruding imperfections.

I have devised a new and improved rivet in which the rivet itself drills its own hole, remains power driven by the drill which through the unique system of threads and the like actually rivets the materials together without ever removing the initial drilling portion. It is also possible by the use of this device to achieve perfect alignment and tightness achieved through the power drill.

Thus it is an important object of this invention to provide a rivet which drills its own hole.

It is a further object of this invention to provide a rivet which can be held in a common power drill for application.

It is a further object of this invention to provide a rivet which drills its own hole and rivets the materials through which it has been drilled simultaneously.

The foregoing and other objects and advantages of this invention will be clear to those skilled in the art upon reading the following specifications in conjunction with the attached drawings in which:

FIGURE 1 is a partially broken away figure showing two pieces of material to be fastened with a preferred embodiment of this invention in place prior to fastening;

FIGURE 2 is the same view as FIGURE 1 after the materials are fastened;

FIGURE 3 is a partial section through 3—3 of FIGURE 1;

FIGURE 4 is a partial section through 4—4 of FIGURE 2;

FIGURE 5 is a partially broken away figure showing an alternate embodiment of the device of this invention; and FIGURE 6 is an alternate form of the center shank of this invention.

It will be observed that the rivet is basically a hollow tubular item 10 of metal or the like, having a shoulder or flange 12 at one end. The interior of the tube is threaded 17 with a left-hand thread.

Inserted through the tube 10 and engaging the threads 17 there is an elongated shank 13 having means 14 at the end extending from the flanged portion 12 of said rivet to be gripped by the jaws of a chuck or the like on an electric drill or the like. The other end of the shank 13 is seen to terminate in a drill tip 19 which is either a standard form of drill tip as is well known in the trade, or may be merely a flattened portion with a hardened or other cutting surface. The larger portion of the drill tip is seen to extend to the full outer diameter of the rivet itself, or slightly beyond.

The shank may be reduced in diameter above its threaded portion 15 to allow easy insertion threading into the rivet so that the drill tip 19 can be integral with the shank and contact the bottom of the rivet itself as is shown.

It will be observed that at a point intermediate its ends the internal shank has a portion 16 with a reduced diameter. This is to allow this shank to break off at that point when sufficient torque is applied to it.

It will also be observed that in one embodiment the rivet has a slightly flared and/or fluted outer upper end 11 so that it will wedge in the hole which is drilled in order to prevent twisting after it seats and the bottom portion is being deformed upward to perform the riveting activity.

In addition it will be noted that a portion 18 of the threaded area of the rivet may be filled with a thermoset plastic or other similar material so that all parts will be held in position until seated, and in addition this material may assist in causing a positive seal against possible leaking of materials through the rivet.

It will be noted that in an alternate embodiment there are locking tabs 111 which will engage the top of the material 131 being riveted to prevent the rivet from turning as the continued screwing of the threaded shank 113 deforms the rivet into position.

Particular note must be made of the left-handed thread in that when this item starts to drill a hole through the materials the drill tip will drill in the normal manner and the rivet will be unaffected. However, when the rivet seats against the material after the drill tip has gone through, then the tendency will be for the center threaded shank to back up, since it is a left-hand thread, and this will collapse the material as desired to complete the riveting action. Naturally it would be possible to have the drill itself left-handed and the thread right-handed in order to accomplish this same end, but since most drills normally operate in the right-hand direction it is deemed more desirable that it be formed in the manner shown.

It is further to be noted that the threading can be all the way through, or only at a limited portion of the interior of the rivet, and it should also further be noted that if desired the frangible feature may be eliminated and the rivet may be fastened as heretofore described until the threads have actually been stripped from the inside of the rivet. At this point the shank can be driven through the rivet and discarded in that manner.

It is also possible to coat the entire rivet on its exterior surface as well as its interior surfaces with a suitable thermoset plastic material or the like to seal positively against any leakage, for example when used to rivet tanks and the like. In such cases, there should be adequate thermoset or other material inside the rivet as previously indicated as well as outside, so that the shank portion will seal with this material on the interior and the exterior of the rivet make it seal in the hole it has drilled.

In examining closely the various figures, it will be noted in FIGURE 1 that two pieces of material 30 and 31 have been drilled by the drill tip 19 and the rivet 10 has dropped through the hole with the drill as it has penetrated. The flared or fluted area 11 on the rivet has wedged itself into the hole so that it will not turn any longer with the drill, and the flanged upper portion 12 will be in a position to be drawn tightly down against the material 31 being fastened.

The upper shank 13 is attached to a drill chuck or is otherwise handled for turning for the drilling operation as well as the fastening operation. It may have lugs or the like 14 to further engage special chucks or the like. The interior of the rivet is seen to be partially threaded at 17 and partially filled with a plastic or thermosetting material 18. The shank itself contains left-hand threads 14 with a reduced diameter portion 16.

Referring now to FIGURE 2 the same features will be seen except that it will be noted that the continued drilling action has caused the lower portion of the rivet tube 10 to collapse against the material 30, thereby riveting the materials 30 and 31 together through the collapsed lower portion 10 and the upper flange 12. It will also be observed that the frangible reduced area portion 16 has now fractured and the extended shank will no longer exist giving an essentially flush upper surface of the rivet and riveted area.

In FIGURE 3 there are no additional features, but the wedging action of the fluted portion 11 is observed in the hole 32 which was drilled in the material at the start of the operation. The sectionalized view FIGURE 4 also shows nothing additional other than a more clear representation of the fracturing and removal of the upper part of the shaft.

FIGURE 5 shows specifically the alternate embodiment in which materials 130 and 131 are to be joined, the rivet shank 113 has been chucked in a drill and has drilled a hole 132 through the two materials being joined. The locking tabs 111 bite into the upper surface of material 131 to prevent further turning in a right-hand direction of the rivet itself. At this point the threads 115 on the shank begin to back out, since they are left-handed threads, in their contact with threads 117 on the interior of the rivet. In phantom lines the collapsed portion of the rivet 110 completing the riveting action of the two materials being joined is indicated. It will be observed that a proper sealing material 118 may also be applied in this embodiment although it need not be included if it is not desired. As the tension increases the torque of course will increase and the frangible portion 118 will fracture to give the same result as indicated in the prior embodiment.

FIGURE 6 indicates a threaded shank having numerous reduced areas 16, 26, 36 and others if desired, together with a slot 20 for use with a screwdriver or the like for insertion. When used in this form the shank may be so designed with its numerous reduced areas that it will fracture at the proper position when used in materials of varying thicknesses. For example, very thin materials might fracture only at the lower point, while intermediate materials might fracture at an intermediate point, and so forth. If desired, these reduced portions 16, 26, 36, and so forth, may be of varying size in order to more readily accomplish alternate rigging positions at different torques or the like.

While the embodiments specifically shown and described are fully capable of performing the objects and achieving the advantages desired, such embodiments are for illustrative purposes only and it is not my intention to be limited to those embodiments.

I claim:

1. A rivet comprising a hollow elongated tube having a flange at one end and having its outer surface slightly tapered toward said flange at that end; a portion of the interior of said tube at the flanged end of the tubular rivet having internal threads; and the portion not having threads being of larger diameter than the portion having threads; a threaded shank inserted in the threads in said tube, said threaded shank having a portion adapted to be gripped by the jaws of the chuck at the end adjacent said flanged portion and a drill tip for drilling in the opposite direction from the direction of said internal threads at the other end of said threaded shank; and a plastic material filling the space between the enlarged portion of said hollow tube and said shank.

2. The device of claim 1 in which the outer portion of said rivet is encased in a plastic sealable material.

References Cited

UNITED STATES PATENTS

| | | | |
|---|---|---|---|
| 1,342,201 | 6/1920 | Beckwith | 85—68 |
| 2,150,080 | 3/1939 | Rawlings | 85—83 |
| 2,466,013 | 5/1949 | Eaton | 85—70 |
| 2,536,353 | 1/1951 | Cooper | 85—77 |
| 2,913,953 | 11/1959 | Tendler | 85—71 |
| 3,316,796 | 5/1967 | Young | 85—68 |

FOREIGN PATENTS 646,298    11/1950    Great Britain.

CHARLIE T. MOON, *Primary Examiner.*